United States Patent [19]

Ávár et al.

[11] 3,936,479
[45] Feb. 3, 1976

[54] ORGANIC COMPOUNDS

[75] Inventors: Lajos Ávár, Binningen, Basel-Land; Kurt Hofer, Munchenstein, Basel-Land; Martin Preiswerk, Basel, all of Switzerland

[73] Assignee: Sandoz Ltd., (Sandoz AG), Basel, Switzerland

[22] Filed: May 4, 1973

[21] Appl. No.: 357,375

[30] Foreign Application Priority Data
May 9, 1972    Switzerland........................ 6864/72

[52] U.S. Cl.......... 260/404; 260/45.9 NC; 260/470; 260/471 R; 260/557 R; 260/558 A; 260/558 P; 260/558 S; 260/558 D; 260/559 R; 260/559 S; 260/562 P; 260/570 R; 252/510; 252/511; 204/158 R; 204/159.13; 204/159.14; 204/159.21; 204/159.22

[51] Int. Cl.².............. C07C 103/42; C07C 103/62; C07C 103/80

[58] Field of Search ....... 260/558, 465 D, 559, 562, 260/557, 471 R

[56] References Cited
UNITED STATES PATENTS

| | | | |
|---|---|---|---|
| 3,239,564 | 3/1966 | Reeder et al. | 260/562 |
| 3,329,701 | 4/1967 | Saucy et al. | 260/562 |
| 3,336,295 | 8/1967 | Sternbach et al. | 260/562 |
| 3,402,171 | 9/1968 | Reeder et al. | 260/562 |
| 3,435,041 | 3/1969 | Drukker et al. | 260/562 |
| 3,576,001 | 4/1971 | Bell et al. | 260/562 |
| 3,634,455 | 1/1972 | Lednicer | 260/562 |
| 3,781,353 | 12/1973 | Ning et al. | 260/562 |

*Primary Examiner*—Harry I. Moatz
*Attorney, Agent, or Firm*—Gerald D. Sharkin; Richard E. Vila; Thomas C. Doyle

[57] ABSTRACT

The present invention concerns benzophenone compounds of the formula:

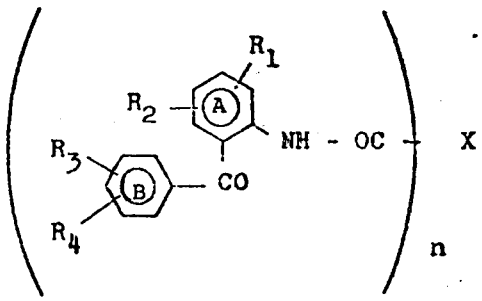

wherein
$R_1$, $R_2$, $R_3$ and $R_4$ are hydrogen or substituents, e.g. alkyl,
X is a mono-, di- or trivalent radical and
$n$ is an integer 1, 2 or 3.

The compounds are useful as U.V. stabilizers for, for example, plastics materials.

26 Claims, No Drawings

ORGANIC COMPOUNDS

The present invention relates to ketocompounds and more specifically to benzophenone derivatives. In particular, the present invention relates to benzophenone derivatives which are useful in the stabilisation of organic materials against degradation by ultraviolet radiation, hereinafter referred to as U.V. stabilisers.

Accordingly, the present invention provides a method of stabilising organic material susceptible to U.V. degradation which comprises treating said organic material with a compound of formula I,

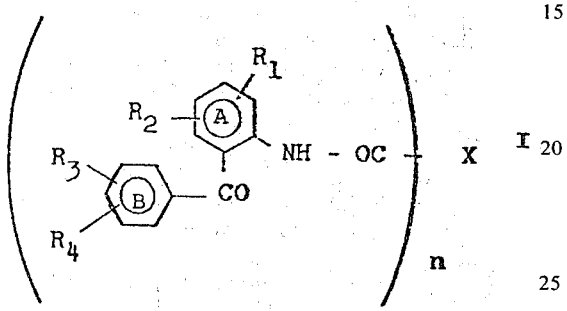

wherein $R_1$, $R_2$, $R_3$ and $R_4$ are, independently, hydrogen; fluorine; chlorine; bromine; cyano; alkyl of 1 to 12 carbon atoms; alkoxy of 1 to 18 carbon atoms; cycloalkyl of 5 to 12 ring carbon atoms; cycloalkylalkyl of 5 to 11 ring carbon atoms and 6 to 12 carbon atoms in the aggregate thereof; cycloalkoxy of 5 to 12 ring carbon atoms; cycloalkylalkoxy of 5 to 12 ring carbon atoms and 6 to 18 carbon atoms in the aggregate thereof; cycloalkyl, cycloalkylalkyl, cycloalkoxy or cycloalkylalkoxy, as defined, ring mono-, di- or tri- substituted by alkyl of 1 to 4 carbon atoms; aryl of 6 to 14 carbon atoms; aryl of 6 to 14 aryl carbon atoms substituted by hydroxyl; aryl of 6 to 14 aryl carbon atoms substituted by 1 or 2 alkyls each of 1 to 4 carbon atoms; aryl of 6 to 14 aryl carbon atoms substituted by hydroxyl and further substituted by 1 to 2 alkyls each of 1 to 4 carbon atoms; aralkyl of 6 to 14 aryl carbon atoms and 7 to 15 carbon atoms in the aggregate thereof; aralkyl of 6 to 14 aryl carbon atoms and 7 to 15 carbon atoms in the aggregate thereof ring substituted by hydroxyl; aralkyl of 6 to 14 carbon atoms and 7 to 15 aralkyl carbon atoms ring substituted by 1 or 2 alkyls each of 1 to 4 carbon atoms; aralkyl of 6 to 14 carbon atoms and 7 to 15 aralkyl carbon atoms ring substituted by hydroxyl and further ring substituted by 1 or 2 alkyls each of 1 to 4 carbon atoms; aralkoxy of 6 to 14 aryl carbon atoms and 7 to 18 carbon atoms in the aggregate thereof; aralkoxy of 6 to 14 aryl carbon atoms and 7 to 18 aralkoxy carbon atoms ring substituted by alkyl of 1 to 4 carbon atoms; a radical —COOR$_5$, wherein $R_5$ is hydrogen, alkyl of 1 to 18 carbon atoms; cycloalkyl of 5 to 12 carbon atoms; cycloalkylalkyl of 5 to 12 ring carbon atoms and 6 to 18 carbon atoms in the aggregate thereof; cycloalkyl or cycloalkylalkyl, as defined, ring mono-, di- or tri- substituted by alkyl of 1 to 4 carbon atoms; aralkyl of 6 to 14 aryl carbon atoms and 7 to 18 carbon atoms in the aggregate thereof; phenyl; phenyl substituted by hydroxyl; phenyl substituted by 1 or 2 alkyls each of 1 to 14 carbon atoms and 7 to 20 carbon atoms in the aggregate thereof; phenyl substituted by hydroxyl and further substituted by 1 or 2 alkyls, each of 1 to 14 carbon atoms, having 7 to 20 carbon atoms in the aggregate thereof;

or alkyl, cycloalkyl, cycloalkylalkyl, alkylcycloalkyl, alkylcycloalkylalkyl, or aryl or aralkyl, unsubstituted or ring substituted by hydroxyl and/or alkyl, as defined, bound to the benzophenone aromatic nucleus via an —SO— or an —SO$_2$— linkage, n is an integer 1, 2 or 3, when n is 1, then X is alkyl of 1 to 22 carbon atoms; alkenyl of 2 to 22 carbon atoms; alkynyl of 2 to 22 carbon atoms; cycloalkyl of 5 to 12 carbon atoms; cycloalkenyl of 5 to 12 carbon atoms; cycloalkylalkyl of 5 to 12 ring carbon atoms and 6 to 22 carbon atoms in the aggregate thereof; cycloalkylalkenyl of 5 to 12 carbon atoms and 7 to 22 carbon atoms in the aggregate thereof; cycloalkyl, cycloalkenyl, cycloalkylalkyl, or cycloalkylalkenyl as defined mono-, di- or tri- ring substituted by alkyl of 1 to 4 carbon atoms; aralkyl of 6 to 14 aryl carbon atoms and 7 to 22 carbon atoms in the aggregate thereof; aralkyl of 6 to 14 aryl carbon atoms and 7 to 22 carbon atoms in the aggregate thereof ring substituted by hydroxyl; aralkyl of 6 to 14 aryl carbon atoms and 7 to 22 aralkyl carbon atoms, ring substituted by 1 or 2 alkyls, each of 1 to 4 carbon atoms; aralkyl of 6 to 14 aryl carbon atoms and 7 to 22 aralkyl carbon atoms, ring substituted by hydroxyl and further ring substituted by 1 or 2 alkyls, each of 1 to 4 carbon atoms; aralkenyl of 6 to 14 aryl carbon atoms and 8 to 22 carbon atoms in the aggregate thereof; aralkenyl of 6 to 14 aryl carbon atoms and 8 to 22 carbon atoms in the aggregate thereof, ring substituted by hydroxyl; aralkenyl of 6 to 14 aryl carbon atoms and 8 to 22 aralkenyl carbon atoms ring substituted by 1 or 2 alkyls, each 1 to 4 carbon atoms; aralkenyl of 6 to 14 aryl carbon atoms and 8 to 22 aralkenyl carbon atoms ring substituted by hydroxyl and further ring substituted by 1 or 2 alkyls; alkenyl, alkynyl, cycloalkylalkyl, cycloalkylalkenyl, or aralkyl or aralkenyl, unsubstituted or ring substituted by hydroxyl and/or alkyl, as defined, containing a linkage selected from —O—, —S—, —SO— and —SO$_2$— in a non-cyclic alkylene portion thereof; phenyl; fluoro, chloro, bromo, cyano or hydroxy substituted phenyl; phenyl substituted by 1 or 2 alkyls each of 1 to 8 carbon atoms; phenyl substituted by 1 or 2 alkoxy radicals each of 1 to 12 carbon atoms; phenyl substituted either by hydroxyl or by 1 or 2 alkoxy radicals each of 1 to 12 carbon atoms, further substituted by 1 or 2 alkyls each of 1 to 8 carbon atoms; phenyl substituted by phenyl; phenyl substituted by phenoxy; or phenyl substituted by a radical $R_6SO_2$— wherein $R_6$ is alkyl of 1 to 22 carbon atoms; alkyl of 1 to 22 carbon atoms substituted by chlorine or bromine; cycloalkyl of 5 to 12 ring carbon atoms; cycloalkylalkyl of 5 to 12 ring carbon atoms and 6 to 22 carbon atoms in the aggregate thereof; cycloalkyl or cycloalkylalkyl as defined mono-, di- or tri- ring substituted by alkyl of 1 to 4 carbon atoms; phenyl; or phenyl substituted by 1 or 2 alkyls each of 1 to 4 carbon atoms;

when n is 2, then X is alkylene of 1 to 22 carbon atoms; cycloalkylene of 5 to 12 ring carbon atoms; cycloalkylalkylene of 5 to 12 ring carbon atoms and 6 to 22 carbon atoms in the aggregate thereof; cycloalkylene or cycloalkylalkylene as defined mono-, di- or tri- ring substitued by alkyl of 1 to 4 carbon atoms; aralkylene of 6 to 14 aryl carbon atoms and of 7 to 22 carbon atoms in the aggregate thereof; aralkenylene of 6 to 14 aryl carbon atoms and 8 to 22 carbon atoms in the aggregate thereof; alkylene, cycloalkylalkylene, alkylcycloalkylene, alkylcycloalkylalkylene, aralkylene or aralkenylene, as defined, and containing an -S- linkage in a non-cyclic alkylene portion thereof; phenylene, diphenylene, or diphenylene oxide; and when n is 3, then X is trivalent phenyl.

The preferred U.V. stabilizers of the method of the present invention are the compounds of formula Ia,

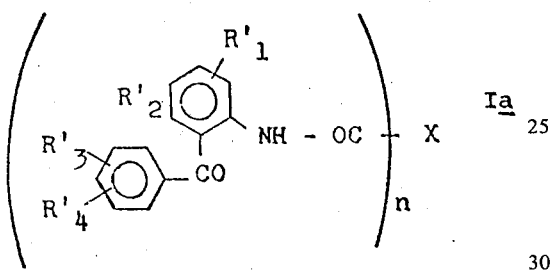

wherein $R_1'$, $R_2'$, and $R_4'$ are, independently, hydrogen; fluorine; chlorine; bromine; alkyl of 1 to 12 carbon atoms; cycloalky of 5 to 12 ring carbon atoms; cycloalkylalkyl of 5 to 11 ring carbon atoms and 6 to 12 carbon atoms in the aggregate thereof; alkoxy of 1 to 12 carbon atoms; cycloalkoxy of 5 to 12 ring carbon atoms; cycloalkylalkoxy of 5 to 11 ring carbon atoms and 6 to 12 carbon atoms in the aggregate thereof; cycloalkyl, cycloalkylalkyl, cycloalkoxy or cycloalkylalkoxy, as defined above, mono-, di- or tri- ring substituted by alkyl of 1 to 4 carbon atoms; phenyl; phenyl substituted by hydroxyl; phenyl substituted by 1 or 2 alkyls each of 1 to 4 carbon atoms; phenyl substituted by hydroxyl and further substituted by 1 or 2 alkyls, each of 1 to 4 carbon atoms; a radical —COOR$_5'$, wherein $R_5'$ is alkyl of 1 to 8 carbon atoms; cycloalkyl of 5 to 8 ring carbon atoms; cycloalkylalkyl of 5 to 7 ring carbon atoms and 6 to 8 carbon atoms in the aggregate thereof; cycloalkyl or cycloalkylalkyl as defined, mono-, di- or tri- ring substituted by alkyl of 1 to 4 carbon atoms; phenyl; phenyl substituted by hydroxyl; phenyl substituted by 1 or 2 alkyls each of 1 to 4 carbon atoms; or phenyl substituted by hydroxyl and further substituted by 1 or 2 alkyls each of 1 to 4 carbon atoms;

or alkyl, cycloalkyl, cycloalkylalkyl, alkylcycloalkyl, alkylcycloalkylalkyl, or phenyl unsubstituted or substituted by hydroxyl and/or alkyl, as defined above, bound to the benzophenone nucleus via an —S— or an —SO$_2$— linkage, and n and X are as defined above.

Further preferred U.V. stabilizers of the method of the present invention are the compounds of formula Ib,

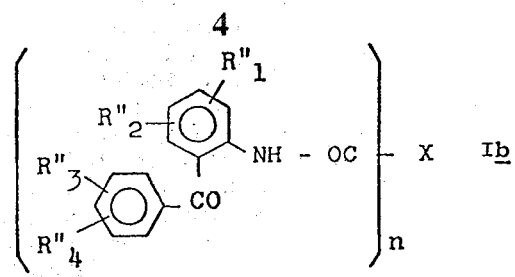

wherein $R_1''$ and $R_4''$, independently, are hydrogen; fluorine; chlorine; bromine; alkyl of 1 to 8 carbon atoms; cycloalkyl of 5 to 8 ring carbon atoms; cycloalkylalkyl of 5 to 7 ring carbon atoms and 6 to 8 carbon atoms in the aggregate thereof; alkoxy of 1 to 12 carbon atoms; cycloalkoxy of 5 to 8 ring carbon atoms; cycloalkylalkoxy of 5 to 8 ring carbon atoms and 6 to 12 carbon atoms in the aggregate thereof; or cycloalkyl, cycloalkylalkyl, cycloalkoxy or cycloalkylalkoxy, as defined above, mono-, di- or tri- ring substituted by alkyl of 1 to 4 carbon atoms;

$R_2''$ has one of the significances of $R_1''$ or $R_4''$, or is cyano, phenyl or —COOR$_5'$ wherein $R_5'$ is as defined above, $R_3''$ is hydrogen and n and X are as defined above.

Still further preferred U.V. stabilizers of the method of the present invention are the compounds of formula Ic,

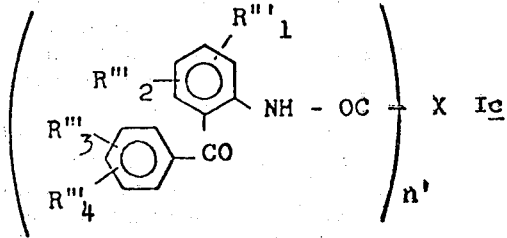

wherein $R_1'''$ is hydrogen or alkyl of 1 to 4 carbon atoms, $R_2'''$ and $R_4'''$ are, independently, hydrogen, alkyl of 1 to 4 carbon atoms, fluorine, chlorine, bromine, or alkoxy of 1 to 8 carbon atoms, $R_3'''$ is hydrogen, n' is an integer 1 or 2 and X is as defined above.

Still further preferred U.V. stabilizers of the method of the present invention are compounds of formula Id,

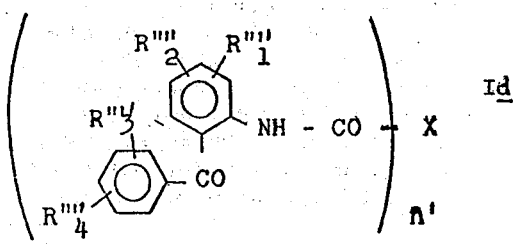

wherein $R_1''''$ is hydrogen or alkyl of 1 to 4 carbon atoms, $R_4''''$ is hydrogen, alkyl of 1 to 4 carbon atoms, fluorine, chlorine, bromine or alkoxy of 1 to 8 carbon atoms, $R_2''''$ and $R_3''''$ are each hydrogen and $n'$ and X are as defined above.

When any or all of $R_1$, $R_2$, $R_3$, $R_4$ or X of formula I, or where appropriate, their counterparts in formulae Ia, Ib, Ic or Id, are or contain aryl of 6 to 14 carbon atoms (i.e. substituted or unsubstituted aryl, aralkyl or aralkoxy), the aryl or aryl portion thereof is preferably phenyl, naphthyl, fluorenyl, acenaphthyl, anthracenyl or phenanthryl. Preferably said aryl or aryl portion is of 6 to 12 carbon atoms, e.g. phenyl, naphthyl, fluorenyl or acenaphthyl and more preferably said aryl or aryl portion is phenyl or naphthyl, particularly phenyl.

When any or all of $R_1$, $R_2$, $R_3$ or $R_4$, or where appropriate their counterparts in formulae Ia, Ib, Ic, or Id, are or contain an alkyl group of more than 2 carbon atoms, this may be linear or branched, primary or secondary, or when of more than 3 carbon atoms, tertiary. Examples of primary alkyl radicals $R_1$, $R_2$, $R_3$ or $R_4$ are methyl, ethyl, propyl, butyl, pentyl, hexyl, and unbranched alkyl radicals with 7 to 12 carbon atoms. Examples of secondary alkyl radicals are isopropyl, 2-butyl, 3-methyl-2-butyl, 2-pentyl, 2,2-dimethyl-3-butyl, 2-hexyl, 3-hexyl, 2-methyl-3-pentyl, 3-methyl-2-pentyl, 4-methyl-2-pentyl, 2,2-dimethyl-3-pentyl, 2,4-dimethyl-3-pentyl, 2-heptyl, 3-heptyl, 4-heptyl, 2-methyl-3-hexyl, 4-methyl-3-hexyl, 5-methyl-3-hexyl, 3-ethyl-4-hexyl, 2,2-dimethyl-3-hexyl, 2,4-dimethyl-3-hexyl, 2,5-dimethyl-3-hexyl, 3,4-dimethyl-2-hexyl, 2-methyl-3-heptyl, 3-methyl-2-heptyl, 3-methyl-4-heptyl, 4-methyl-3-heptyl, 5-methyl-3-heptyl, 6-methyl-2-heptyl, 2-octyl, 3-octyl, 4-octyl, 2,2,4-trimethyl-3-pentyl, 5-ethyl-2-heptyl, 2,2-dimethyl-3-heptyl, 2,6-dimethyl-4-heptyl, 2-methyl-3-octyl, 3-methyl-4-octyl, 6-ethyl-3-octyl, 2-decyl, 5-decyl, 2,2-dimethyl-3-octyl, 2-methyl-4-nonyl, 3-methyl-4-nonyl, 6-ethyl-3-decyl, 7-ethyl-2-methyl-4-nonyl, 2-dodecyl, 2,6,8-trimethyl-4-nonyl. Examples of tertiary radicals for $R_1$, $R_2$, $R_3$ or $R_4$ are tertiary butyl, 2-methyl-2-butyl, 2,3-dimethyl-2-butyl, 2-methyl-2-pentyl, 3-methyl-3-pentyl, 3-ethyl-3-pentyl, 2,4-dimethyl-2-pentyl, 2-methyl-2-hexyl, 3-methyl-3-hexyl, 3,4-dimethyl-3-hexyl, 3,5-dimethyl-3-hexyl, 2-methyl-2-heptyl, 3-methyl-3-heptyl, 4-methyl-4-heptyl, 2,3,4-trimethyl-3-pentyl, 2,4,4-trimethyl-2-pentyl, 3-ethyl-3-heptyl, 2-methyl-2-octyl, 4-methyl-4-octyl, 2-methyl-1-propyl, 2,2-dimethyl-1-propyl, 2-methyl-1-butyl, 2-ethyl-1-butyl, 2,2-dimethyl-1-butyl, 2-methyl-1-pentyl, 3-methyl-1-pentyl, 4-methyl-1-pentyl, 2,4-dimethyl-1-pentyl, 2-ethyl-1-hexyl, 2,2-dimethyl-1-hexyl, 2,2,4-trimethyl-1-pentyl, 4-methyl-2-propyl-1-pentyl, 3,7-dimethyl-1-octyl and 2,2-dimethyl-1-decyl.

When any or all of $R_1$, $R_2$, $R_3$ or $R_4$ of formula I, or their counterparts in formulae Ia, Ib, Ic or Id, are alkyl or alkoxy, preferably these each have 1 to 6 carbon atoms, more preferably 1 to 5 carbon atoms, particularly 1 to 4 carbon atoms. In addition, when any or all of $R_1$, $R_2$, $R_3$ or $R_4$, or their counterparts in formulae Ia, Ib, Ic or Id, are alkoxy, this is preferably primary or secondary alkoxy, more preferably primary alkoxy.

When X in formula I, or its counterpart in formulae Ia, Ib, Ic or Id, is alkyl, this is preferably of more than 1 carbon atom, particularly 2 to 20 carbon atoms, especially 2 to 17 carbon atoms, e.g. 5 to 17 carbon atoms, particularly 7 to 17 carbon atoms.

When X in formula I or its counterpart in formulae Ia, Ib, Ic or Id, is alkenyl or alkynyl, this is preferably of 2 to 20 carbon atoms, especially 3 to 17 carbon atoms.

When any or all of $R_1$, $R_2$, $R_3$, $R_4$ or X of formula I, or where appropriate, their counterparts in formulae Ia, Ib, Ic or Id, are or contain cycloalkyl, this is preferably of 5 to 7 carbon atoms, particularly 5 or 6 carbon atoms, especially cyclohexyl. Examples of cycloalkyl and alkylcycloalkyl radicals embraced by $R_1$, $R_2$, $R_3$, $R_4$ or X of formula I are cyclopentyl, cyclohexyl, cycloheptyl, 2-, 3- and 4-methylcyclohexyl, cyclooctyl, 2,5-, 2,6-, 3,4- and 3,5-dimethylcyclohexyl, 1-cyclohexylpropyl, 2-propyl-cyclohexyl, 3,3,5-trimethyl-cyclohexyl, 2-butyl-cyclohexyl, 4-tert.butyl-cyclohexyl, 3-methyl-6-isopropyl-cyclohexyl and cyclododecyl. Further examples are 1-methylcyclopentyl, 1-methyl-cyclohexyl, 1-methyl-cycloheptyl, 1-propyl-cyclopentyl and 1-butyl-cyclopentyl. Examples of cycloalkylalkyl radicals embraced by $R_1$, $R_2$, $R_3$, $R_4$ and X of formula I are cyclohexyl-methyl, 2-cyclohexyl-ethyl, cycloheptyl-methyl, 3-cyclohexyl-propyl, cyclooctyl-methyl, cycloundecyl-methyl and cyclododecyl-methyl.

When any or all of $R_1$, $R_2$, $R_3$ and $R_4$ of formula I, or, where appropriate, their counterparts in formulae Ia or Ib are cycloalkoxy, or alkylcycloalkoxy, examples are cyclopentoxy, cyclohexoxy, cycloheptoxy, 2-, 3- and 4-methylcyclohexoxy, cyclooctoxy, 2,5-, 2,6-, 3,4- and 3,5-dimethyl-cyclohexoxy, 1-propyl-cyclohexoxy, 2-propyl-cyclohexoxy, 3,3,5-trimethyl-cyclohexoxy, 2-butyl-cyclohexoxy, 4-tert.butyl-cyclohexoxy, 3-methyl-6-isopropyl-cyclohexoxy, cyclododecyloxy, 1-methylcyclopentoxy, 1-methylcyclohexoxy, 1-methylcycloheptoxy, 1-propyl-cyclopentoxy and 1-butyl-cyclopentoxy.

When any or all of $R_1$, $R_2$, $R_3$ and $R_4$ of formula I, or where appropriate, their counterparts in formulae Ia or Ib are cycloalkylalkoxy, examples are cyclohexyl-methoxy, 2-cyclohexyl-ethoxy, cycloheptylmethoxy, 3-cyclohexyl-propoxy, cyclooctyl-methoxy, cycloundecyl-methoxy and cyclododecyl-methoxy.

When, or as the case may be $n'$, of formulae I, Ia, Ib, Ic and Id, is the integer 1, then X thereof is preferably alkyl of 2 to 22 carbon atoms, especially alkyl of 7 to 17 carbon atoms; phenylalkyl of 7 to 12 carbon atoms, especially of 7 or 8 carbon atoms; phenylalkyl of 7 to 12 carbon atoms ring substituted by hydroxyl; phenylalkyl of 7 to 12 carbon atoms ring substituted by 1 or 2 alkyls each of 1 to 8 carbon atoms, preferably each of 1 to 4 carbon atoms; phenylalkyl of 7 to 12 carbon atoms ring substituted by hydroxyl and further ring substituted by 1 or 2 alkyls each of 1 to 8 carbon atoms; phenylalkenyl of 8 to 12 carbon atoms, especially styryl; phenylalkenyl of 8 to 12 carbon atoms ring substituted by hydroxyl; phenylalkenyl of 8 to 12 carbon atoms ring substituted by 1 or 2 alkyls each of 1 to 8 carbon atoms, preferably each of 1 to 4 carbon atoms; phenylalkenyl of 8 to 12 carbon atoms ring substituted by hydroxyl and further ring substituted by 1 or 2 alkyls each of 1 to 8 carbon atoms; phenyl; phenyl substituted by fluorine, chlorine, bromine, cyano or hydroxyl, especially chlorine, cyano or hydroxyl; phenyl substituted by 1 or 2 alkyls each of 1 to 8 carbon atoms, especially each of 1 to 4 carbon atoms; phenyl substituted by 1 or 2 alkoxy radicals each of 1 to 12 carbon atoms, especially each of 1 to 8 carbon atoms, preferably each of 1 to 4 carbon atoms; phenyl substituted by hydroxyl or 1 or 2 alkoxy radicals, each of 1 to 12 carbon atoms, and further substituted by 1 or 2 alkyls each of 1 to 8 carbon atoms; phenyl substituted by phenyl; or phenyl substituted a radical R₆'SO₂— wherein $R_6'$ is alkyl of 1 to 22 carbon atoms, especially alkyl of 1 to 12 carbon atoms, preferably alkyl of 1 to 6 carbon atoms, particularly alkyl of 1 to 3 carbon atoms; alkyl of 1 to 22 carbon atoms substituted by chlorine or bromine; phenyl; or phenyl substituted by 1 or 2 alkyls each of 1 to 4 carbon atoms; and when $n$, or as the case may be $n'$, of formulae I, Ia, Ib, Ic and Id is the integer 2, then X thereof is phenylene.

When $n$, or as the case may be, $n'$, of formulae I, Ia, Ib, Ic and Id, is the integer 1, then X thereof is more preferably phenyl; phenyl substituted by chlorine, cyano or hydroxyl; phenyl substituted by 1 or 2 alkyls each of 1 to 4 carbon atoms or alkoxy of 1 to 4 carbon atoms; phenyl substituted by hydroxyl and further substituted by 1 or 2 alkyls each of 1 to 4 carbon atoms; or phenyl substituted by phenyl; and in addition when $n$, or as the case may be, $n'$, of formulae I, Ia, Ib, Ic and Id is the integer 2, then X thereof is phenylene.

Particularly interesting U.V. stabilizers of the method of the present invention are the compounds of formula Ie

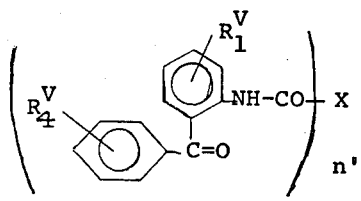

wherein
$R_1^V$ is hydrogen or alkyl of 1 to 4 carbon atoms,
$R_4^V$ is hydrogen, alkyl of 1 to 4 carbon atoms, fluorine, chlorine, bromine or alkoxy of 1 to 4 carbon atoms,
$n'$ is as defined above,
when $n'$ is 1
X is phenyl; 4-alkyl-phenyl having 1 to 4 alkyl carbon atoms; 4-alkoxyphenyl having 1 to 4 alkoxy carbon atoms; 4-hydroxy-phenyl; 4-hydroxyphenyl further ring substituted by 1 or 2 alkyls at the 3- position, or at the 3-, 5- positions respectively of the phenyl nucleus, each alkyl having 1 to 4 carbon atoms; or phenyl 4-substituted by phenyl; and
when $n'$ is 2
then X is 1, 4 phenylene.

Examples of X when $n$, or as the case may be, $n'$, of formulae I, Ia, Ib, Ic and Id, is the integer 1 are:

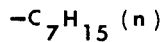

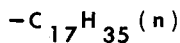

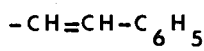

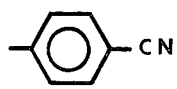

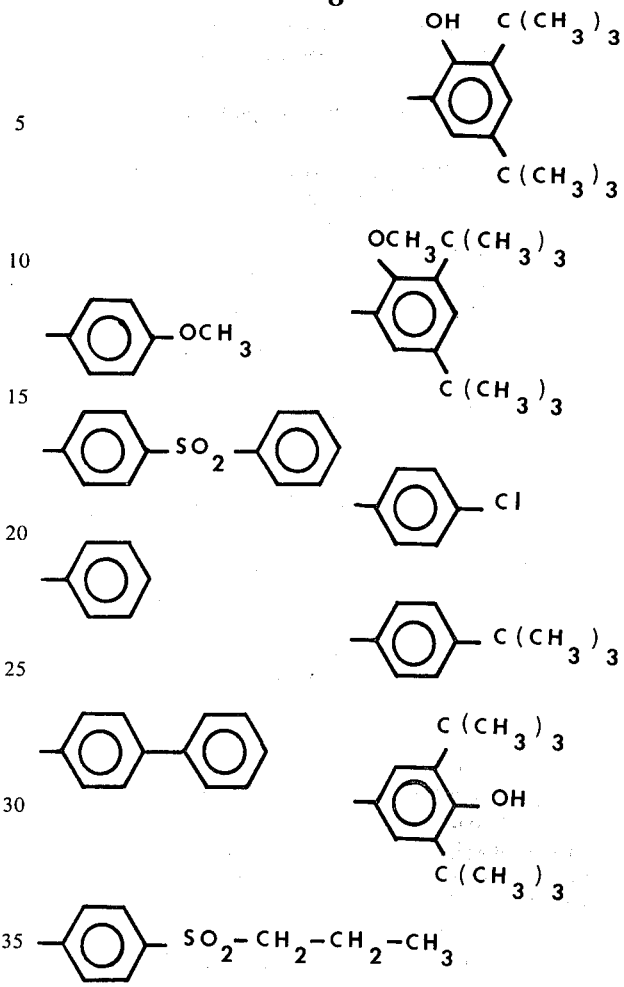

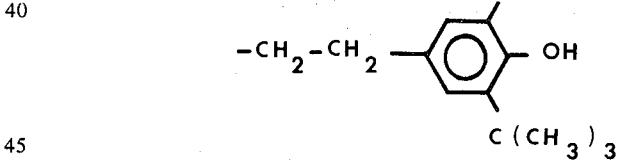

Examples of X when $n$, or as the case may be $n'$, of formulae I, Ia, Ib, Ic and Id is the integer 2 are:

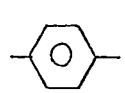 and 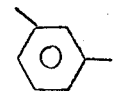

Preferably $n$, or as the case may be, $n'$, of formulae I, Ia, Ib, Ic and Id is the integer 1.

The method of the invention comprises treating the organic material susceptible to U.V. degradation with a compound of formula I, either by coating or mixing, preferably by homogeneously distributing the compound of formula I throughout the organic material. Thus according to a first embodiment, the method may be effected by intimately mixing the U.V. stabilizer with, for example, a plastics material such as polypropylene granules, in a kneader or other suitable device, to obtain uniform distribution of the U.V. stabilizer throughout the plastics material. The plastics material may thereafter be formed into final shape e.g. by extrusion. This embodiment is particularly suited to textile production whereby the stabilized plastics material is extruded in the form of textile filaments.

According to a second embodiment, organic material in final form, for example, textile filaments, is passed through a dispersion of the U.V. stabilizer e.g. in aqueous medium, to provide a protective coating of the U.V. stabilizer.

According to a third embodiment of the method of the present invention, particularly suited to stabilization of polymers or copolymers susceptible to U.V. degradation, the U.V. stabilizer is mixed with the monomer or prepolymer before polymerisation or, as the case may be, copolymerisation, is effected, to yield the polymer or copolymer having the U.V. stabilizer uniformly distributed therethrough.

Examples of organic materials susceptible to U.V. degradation and embraced by the method of the present invention are cellulose acetate, cellulose acetobutyrate, polycarbonates, polyvinyl chloride, polyurethanes, polyvinyl chloride-acetate, polyamides, polystyrene, ethyl cellulose, cellulose nitrate, polyvinyl alcohol, silicon rubber, cellulose propionate, melamineformaldehyde resins, urea-formaldehyde resins, allyl casting resins, polymethyl methacrylate, polyesters, polyacrylonitrile, copolymers, for example, acrylonitrile-butadiene-styrene copolymers, natural products such as rubber, cellulose, wool and silk, and particularly polyalkylenes, e.g. polyethylene or polypropylene.

A notable property of the U.V. stabilizers of the method of the present invention is their heat stability, allowing the method to be effected at elevated temperatures.

In some cases, the method of the present invention also imparts stability against degradation by heat and/or oxygen. Thus, the compounds of formula I wherein either X or the substituents on rings A or B of formula I are or contain the grouping

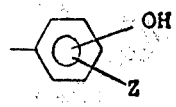

wherein
Z is a tertiary alkyl group, e.g. tertiary butyl,
and the substituents OH and Z are on adjacent carbon atoms on the phenyl nucleus,
are also suited to stabilization of organic materials against degradation by heat or oxygen.

The amount of U.V. stabilizer employed in the method of the invention will of course vary with the mode of application, the compound employed and the nature of the organic material to be treated. In general, however, satisfactory results are obtained when the amount of U.V. stabilizer applied is between 0.01 and 5 %, preferably between 0.05 and 1 %, by weight with respect to the material to be stabilized.

An example of the method of the invention will now be described.

METHOD EXAMPLE 1

Polypropylene granules and a U.V. stabilizer of formula I are mixed in the ratio of 99.5:0.5 by weight, respectively and homogeneously kneaded on a roll mill at a temperature of 180°C. After thorough and uniform distribution of the U.V. stabilizer throughout the polypropylene, the kneaded mixture is extruded through a suitable nozzle to form a polypropylene film of 0.3 mm thickness.

METHOD EXAMPLE 2

Polyethylene granules are mixed with 0.2 % by weight of a binding agent, then rolled for 5 minutes at 95 to 199°C with 0.5 % by weight of a U.V. stabilizer of formula I, e.g of the formula:

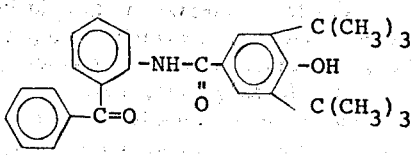

and finally pressed at 170°C into plates of 0.3 mm thickness.

The relative stability of the U.V. stabilized film or plates may be tested in the "klimatest" apparatus by the De La Rue method at a temperature of 40°C and 75 % relative humidity.

The compounds of formula I, with the proviso that when $n$ is the integer 1 and X is phenyl, then $R_1$, $R_2$, $R_3$ and $R_4$ in the aggregate thereof contain at least 4 carbon atoms, hereinafter referred to as compounds of formula I', are new and also form part of the present invention.

The compounds of formula I' may be produced in accordance with a still further aspect of the present invention, by a process which comprises condensing one mol of a compound of formula II, $$(HOOC)_n—X \qquad \text{II}$$

wherein X and $n$ are as defined above,
or a functional derivative thereof, with $n$ mols of a compound of formula III,

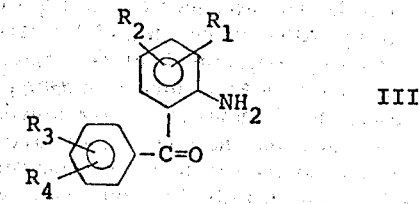

wherein $n$, $R_1$, $R_2$, $R_3$ and $R_4$ are as defined above with the proviso that when $n$ is the integer 1 and X of formula II is phenyl, then $R_1$, $R_2$, $R_3$ and $R_4$ in the aggregate thereof contain at least 4 carbon atoms.

Preferred functional derivatives of the acids of formula II are the anhydrides thereof, for example, succinic anhydride, phthalic anhydride, homophthalic anhydride or diglycolic or thiodiglycolic anhydride, the acid chlorides thereof, and the esters, preferably methyl esters, thereof.

The reaction is preferably effected in the presence of an acid binding agent when the acid chloride functional derivative of the acids of formula II is employed.

If the free carboxylic acid of formula II is employed and is liquid and of sufficiently low volatility, e.g. stearic, adipic or tetraphthalic acids, the compounds II and III can be reacted in the absence of a solvent by heating to a temperature between, e.g. 40° and 100°C, leading to dehydration and formation of the desired product. In the case where both compounds II and III are solid, the reaction may be effected in the melt at a temperature of between 120° and 220°C under normal or reduced pressure. Alternatively, the reaction may be effected in an inert solvent, such as xylene, under heat to slowly distil off the solvent during the reaction thus serving as an entrainer for the removal of water.

A catalyst, for example, boric acid may be added to the reaction mixture.

If desired, the reaction of the free carboxylic acid of formula II with the amine of formula III may be effected under milder conditions than would be otherwise possible by employing a condensation agent, e.g. dicyclohexylcarbodiimide, such as is commonly employed in peptide forming reactions.

The compounds of formulae II and III are either known, or, insofar as they are not known, they may be produced in analogous manner to the processes for producing the known compounds, or by processes known per se.

Examples of the process of the invention will now be described. Where temperatures are referred to, these are in °C.

EXAMPLE 1

Production of the compound:

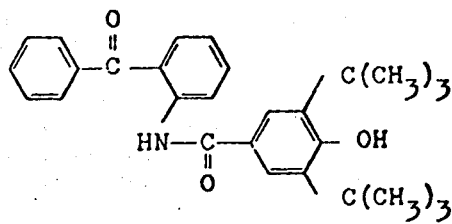

9.9 Parts of 2-aminobenzophenone and 5.1 parts of triethylamine are added to 200 parts of toluene with stirring. After 30 minutes 13.4 parts of 3,5-di. tert. butyl-4-hydroxybenzoyl chloride are added to the turbid mixture with continued stirring. The mixture is reacted for 24 hours at 95°. After cooling it is washed with water and the toluene phase separated. The remaining solution is dried with Glauber's salt and the solvent distilled off. The solid, pale yellow residue is crystallized from methanol.

| Elementary analysis: | C | H | N | O |
|---|---|---|---|---|
| calculated: | 78.3 % | 7.3 % | 3.3 % | 11.2 % |
| found: | 78.1 % | 7.4 % | 3.2 % | 11.3 % |

EXAMPLE 2

Production of the compound:

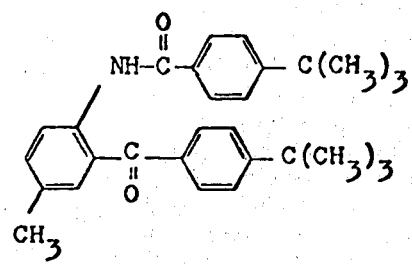

5.34 Parts of 2-amino-5-methyl-4'-tert. butyl benzophenone and 1.6 parts of pyridine are added to 80 parts of toluene, then in 10 minutes 3.92 parts of p-tert. butyl benzoyl chloride are added at room temperature with stirring. The mixture is reacted for 3 hours at 50° with stirring. After the reaction, it is washed with water. The toluene phase is separated, the solvent distilled off, and the residue crystallized from methanol.

| Elementary analysis: | C | H | N |
|---|---|---|---|
| calculated: | 81.6 % | 7.8 % | 3.28 % |
| found: | 81.7 % | 7.5 % | 3.3 % |

The compounds specified in Tables 1 and 2 below are produced in an analogous manner to the processes described in Examples 1 to 2. The structure is identified by micro analysis and by spectral analysis.

Table 1

$$\left( \underset{CO}{\underset{|}{\bigcirc}} \bigcirc^{Q}_{NH-CO} \right)_n X$$

| No. | Q | n | X | M. pt °C |
|---|---|---|---|---|
| 1 | H | 1 | —C$_7$H$_{15}$(n) | oil |
| 2 | H | 1 | —C$_{17}$H$_{35}$(n) | 54–55° |
| 3 | H | 1 | —CH=CH—C$_6$H$_5$ | 109–111° |
| 4 | H | 1 | —⟨◯⟩—CN | 176–177° |
| 5 | H | 1 | —⟨◯⟩—C(CH$_3$)$_3$ | 128–129° |
| 6 | H | 1 | —⟨◯⟩—OCH$_3$ | 102–103° |
| 7 | H | 1 | —⟨◯⟩ (OH, C(CH$_3$)$_3$, C(CH$_3$)$_3$) | 124–125° |
| 8 | H | 1 | —⟨◯⟩ (OCH$_3$, C(CH$_3$)$_3$, C(CH$_3$)$_3$) | 141–142° |
| 9 | H | 1 | —⟨◯⟩—Cl | 111–112° |
| 10 | Cl | 1 | —⟨◯⟩—C(CH$_3$)$_3$ | resin |
| 11 | Cl | 1 | —⟨◯⟩ (C(CH$_3$)$_3$, OH, C(CH$_3$)$_3$) | 250–253° |
| 12 | H | 2 | —⟨◯⟩— | 265–267° |
| 13 | H | 1 | —⟨◯⟩—SO$_2$—⟨◯⟩ | 138–140° |

Table 1-continued

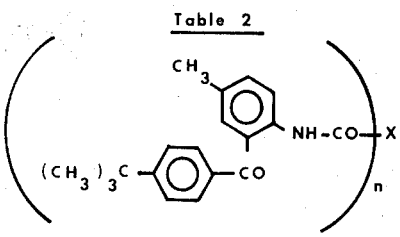

| No. | Q | n | X | M. pt °C |
|---|---|---|---|---|
| 14 | Cl | 1 | –phenyl | 110–111° |
| 15 | H | 3 | –phenyl– | |
| 16 | H | 2 | –phenyl | |
| 17 | Cl | 1 | –biphenyl | 230–36 |
| 18 | phenyl | 1 | $C_{17}H_{35}n$ | 110–12 |
| 19 | phenyl | 1 | –phenyl | 178–80 |
| 20 | Cl | 1 | $C_{17}H_{35}n$ | 74–75 |
| 21 | H | 1 | –biphenyl | 139–40 |
| 22 | Cl | 1 | –phenyl–$OCH_3$ | 144–45 |
| 23 | H | 1 | –phenyl–$SO_2$–$CH_2$–$CH_2$–Cl | 139–40 |

Table 2

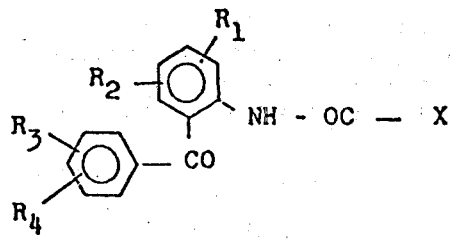

| No. | n | X | M. pt. °C |
|---|---|---|---|
| 24 | 1 | –$CH_2$–$CH_2$–[3,5-di-$C(CH_3)_3$-4-OH-phenyl] | 137–138° |
| 25 | 2 | –phenyl– | |
| 26 | 1 | –[3,5-di-$C(CH_3)_3$-4-OH-phenyl] | |
| 27 | 1 | –phenyl–$OCH_3$ | |
| 28 | 3 | –methylphenyl | |
| 29 | 2 | –methylphenyl | |

What is claimed is:

1. A compound of the formula:

wherein $R_1$, $R_2$, $R_3$ and $R_3$ are independently, hydrogen or alkyl of 1 to 4 carbon atoms, and X is phenyl which is substituted by hydroxy and 1 or 2 alkyls of 1 to 4 carbon atoms, or by alkoxy of 1 to 4 carbon atoms and 1 to 2 alkyls of 1 to 4 carbon atoms, or by phenyl sulphoxide; styryl; or phenylalkyl of 8 carbon atoms which is substituted by hydroxy and 1 or 2 alkyls of 1 to 4 carbon atoms.

2. The compound, of the formula:

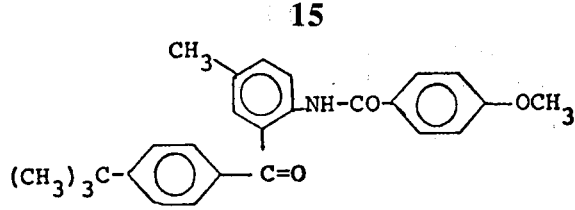

3. A compound of claim 1, wherein X is phenyl substituted by hydroxy and further substituted by 1 or 2 alkyls, each of 1 to 4 carbon atoms.

4. The compound of claim 3, of the formula:

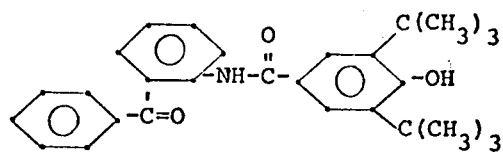

5. The compound of claim 3, of the formula:

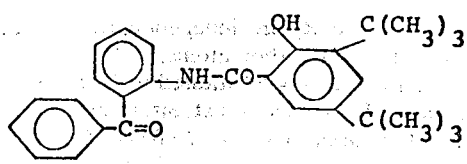

6. The compound of claim 3, of the formula:

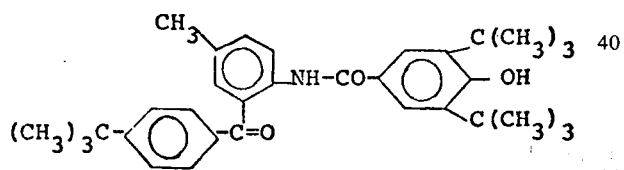

7. A compound of claim 1, wherein X is phenyl substituted by alkoxy of 1 to 4 carbon atoms and further substituted by 1 or 2 alkyls, each of 1 to 4 carbon atoms.

8. The compound of claim 7, of the formula:

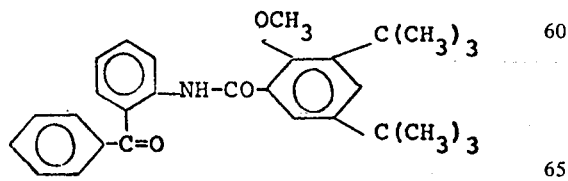

9. The compound, of the formula:

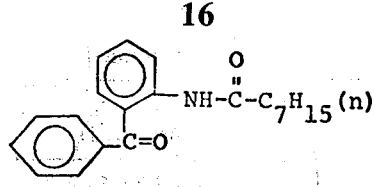

10. The compound, of the formula:

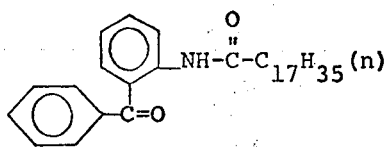

11. A compound of claim 1, wherein X is styryl.

12. The compound of claim 11, of the formula:

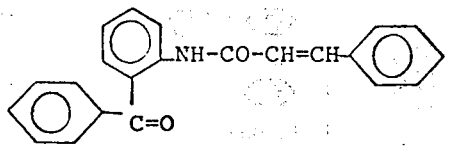

13. A compound of claim 1, wherein X is phenyl substituted by phenyl sulphoxide.

14. The compound of claim 13, of the formula:

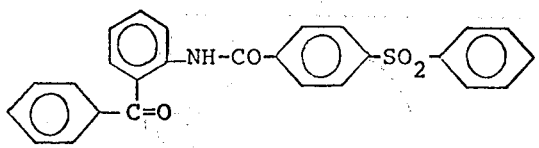

15. A compound of the formula

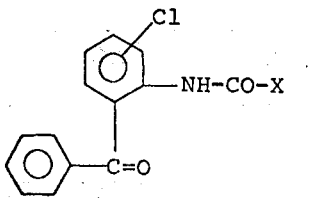

wherein X is phenyl substituted by hydroxy and further substituted by 1 or 2 alkyls, each of 1 to 4 carbon atoms.

16. The compound of claim 15, of the formula:

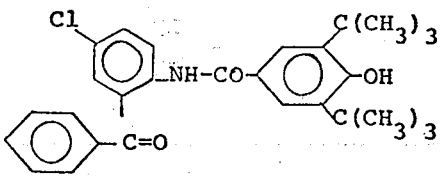

17. A compound of claim 1, wherein X is phenylalkyl of 8 carbon atoms ring substituted by hydroxy and further substituted by 1 or 2 alkyls, each of 1 to 4 carbon atoms.

18. The compound of claim 17, of the formula:

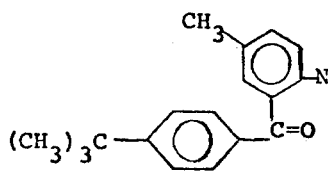
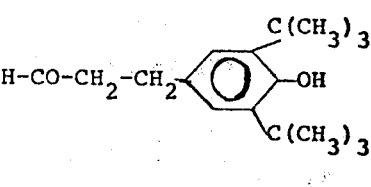
19. A compound of the formula
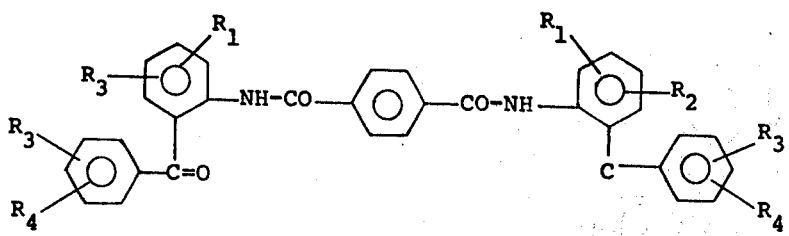
wherein $R_1$, $R_2$, $R_3$ and $R_4$ are each, independently, hydrogen or alkyl of 1 to 4 carbon atoms.
20. The compound of claim 19, of the formula:
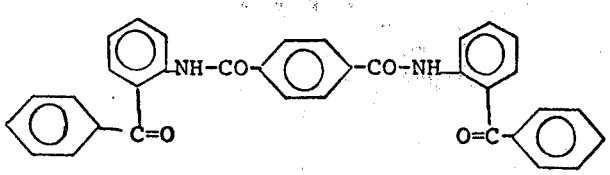
21. The compound of claim 19, of the formula:
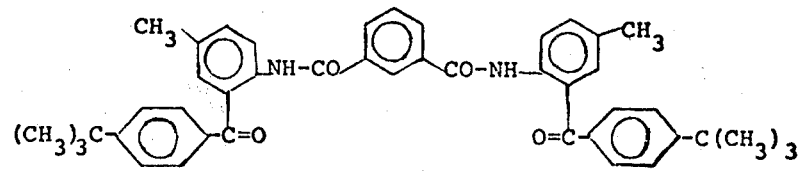
22. The compound of claim 19, of the formula:
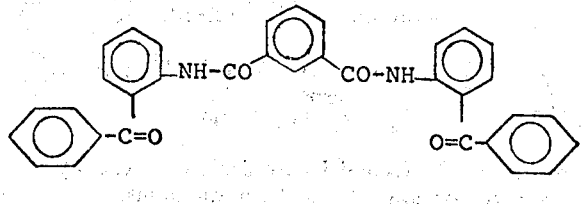
23. The compound of claim 19, of the formula:
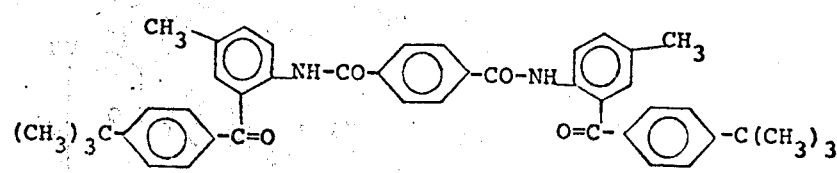
24. A compound of the formula

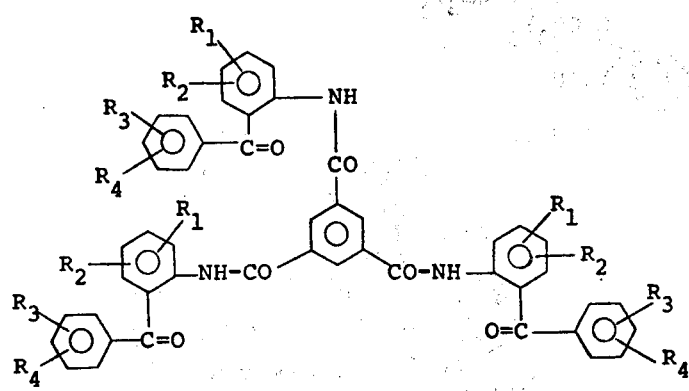
wherein $R_1$, $R_2$, $R_3$ and $R_4$ are each, independently, hydrogen or alkyl of 1 to 4 carbon atoms.
25. The compound of claim 24, of the formula:
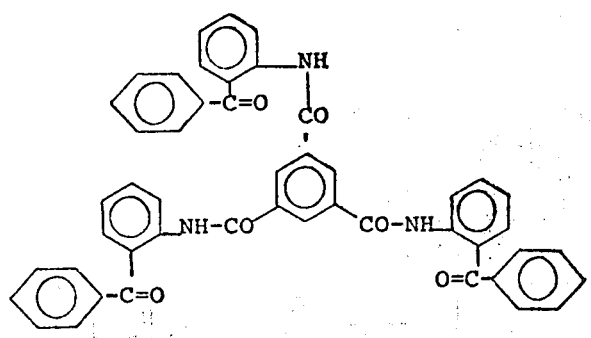
26. The compound of claim 24, of the formula:
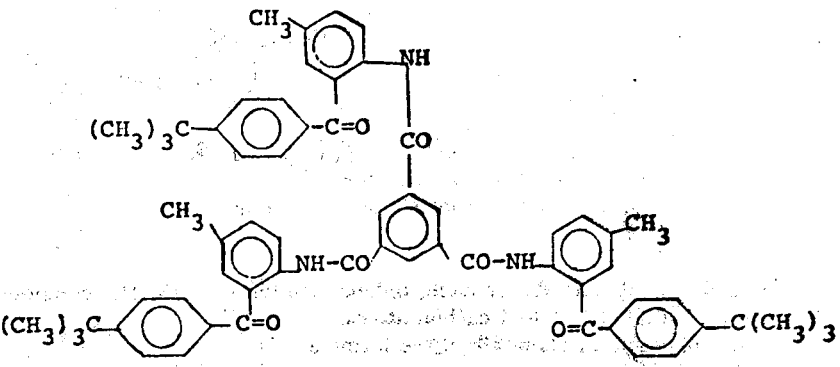
* * * * *